United States Patent
Pepper et al.

(10) Patent No.: US 7,930,722 B2
(45) Date of Patent: Apr. 19, 2011

(54) METHOD AND SYSTEM FOR CREATING, MANAGING AND DELIVERING COMMUNITY INFORMATION

(75) Inventors: Jeffrey A. Pepper, Verona, PA (US); Evan M. Ruiz, Greensboro, NC (US); David A. Hornig, Oakmont, PA (US); Karen A. Graff, Oakmont, PA (US)

(73) Assignee: Touchtown, Inc., Oakmont, PA (US)

( * ) Notice: Subject to any disclaimer, the term of this patent is extended or adjusted under 35 U.S.C. 154(b) by 95 days.

(21) Appl. No.: 11/501,404

(22) Filed: Aug. 9, 2006

(65) Prior Publication Data

US 2007/0074268 A1    Mar. 29, 2007

Related U.S. Application Data

(60) Provisional application No. 60/706,542, filed on Aug. 9, 2005.

(51) Int. Cl.
*H04N 7/18* (2006.01)
(52) U.S. Cl. .............. 725/78; 725/114; 725/115
(58) Field of Classification Search .......... 725/78, 725/114–115
See application file for complete search history.

(56) References Cited

U.S. PATENT DOCUMENTS

| | | | | |
|---|---|---|---|---|
| 5,918,014 A * | 6/1999 | Robinson | ............... | 709/219 |
| 2003/0229446 A1* | 12/2003 | Boscamp et al. | ............. | 701/213 |
| 2005/0289611 A1* | 12/2005 | Taki | ............... | 725/75 |
| 2007/0038727 A1* | 2/2007 | Bailey et al. | ............... | 709/219 |

* cited by examiner

*Primary Examiner* — John W Miller
*Assistant Examiner* — Oschta Montoya
(74) *Attorney, Agent, or Firm* — The Webb Law Firm

(57) ABSTRACT

A method for providing community information concerning an accommodation area includes the steps of (a) inputting community information of the accommodation area to a storage medium; (b) creating a television presentation and a web presentation using software, wherein the software imports the community information from the storage medium and automatically formats and lays out the community information into the television presentation and the web presentation; (c) applying presentation elements having user-modifiable rules associated therewith to the television presentation and the web presentation; (d) transmitting the television presentation to the accommodation via a distributed communications network; and (e) optionally displaying the web presentation on a web site associated with the accommodation area. A system for creating, managing and delivering community information is also disclosed.

22 Claims, 10 Drawing Sheets

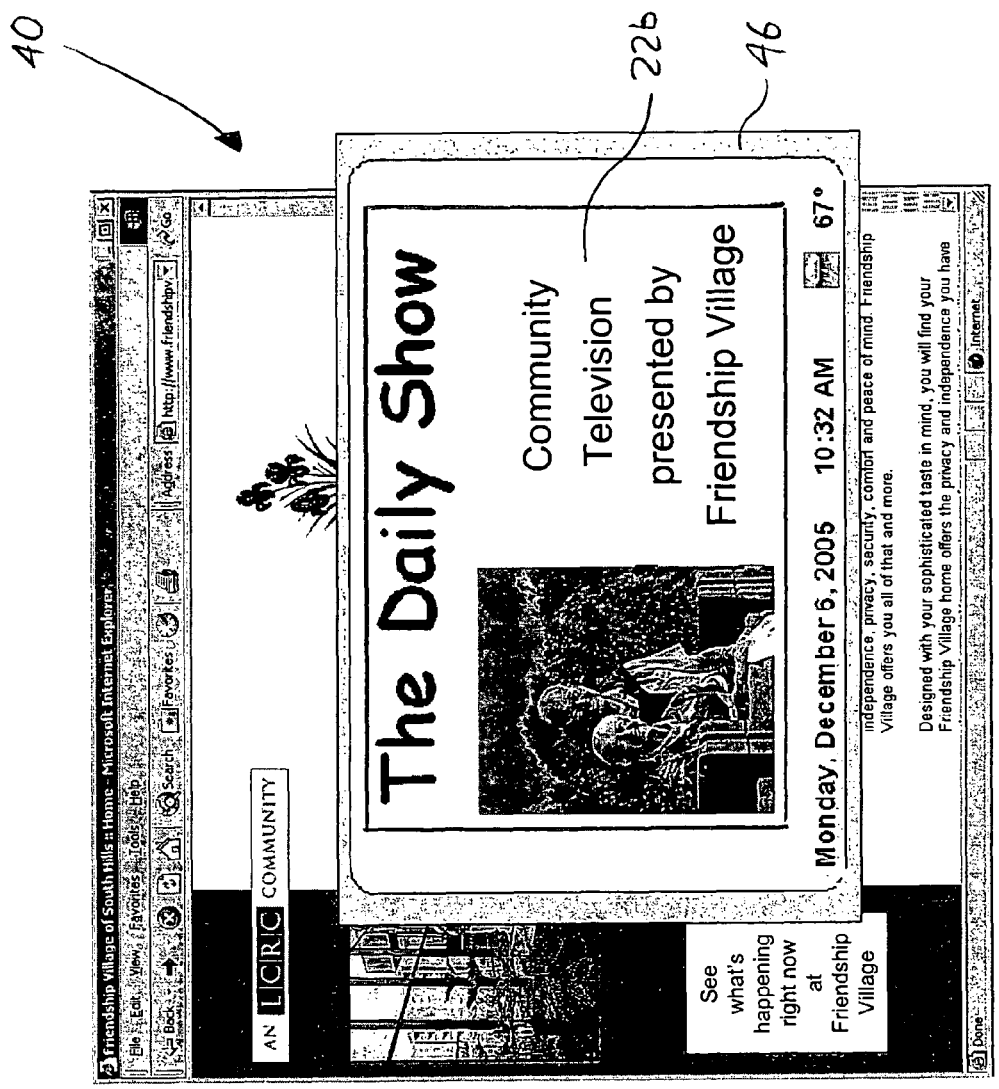

METHOD AND SYSTEM FOR CREATING, MANAGING AND DELIVERING COMMUNITY INFORMATION

CROSS REFERENCE TO RELATED APPLICATIONS

This application claims the benefit of U.S. Provisional Patent Application No. 60/706,542, filed Aug. 9, 2005, and entitled "Method and System for Creating, Managing and Delivering Community Information," the contents of which are incorporated herein by reference.

BACKGROUND OF THE INVENTION

1. Field of the Invention

The present invention relates to community information systems and, more particularly, to efficiently creating presentations that pertain to community information and delivering them simultaneously in various forms of media.

2. Description of Related Art

There are numerous methods and systems in the prior art for effecting transmission and display of predefined data to a targeted audience. Hospitals, airports, hotels, schools, houses of worship, nursing homes, retirement communities, etc. are examples of accommodations areas, either public or private, in which in-house programming is transmitted through a closed-circuit television environment to multiple television monitors within the accommodation area. The predefined data usually includes informational data that may be of interest to persons within the accommodation area. Usually, such informational data is specific to the function of, activities occurring in, and operational aspects relating to the particular accommodation area in which the informational data is shown. Accordingly, such information may be conveyed to that particular accommodation area in various ways.

An example of a prior art system for facilitating communication among members of a community is disclosed in U.S. Patent Application Publication No. US 2003/0050986 to Matthews et al. However, the content delivery in the Matthews system is limited to the context of email, message boards, and an events calendar. Furthermore, active steps are required to be performed by members of the community to not only transmit content, but also receive content. Additionally, the information transmitted via the Matthews system is static and requires new emails and/or messages to be transmitted and retrieved when informational content has been updated. Accordingly, the Matthews system is not conducive to adequately serving the needs of a community that requires a television system in which content is received in a primarily passive manner (e.g., only having to turn on a television and tune to a particular channel) with respect to the recipient.

For example, prior art community-based television systems, also known as private channel television, in-house television, community television and digital signage, transmit informational data to multiple monitors in an accommodation area. The informational data may include activities, calendars, dining menus, announcements, photographs, videos, contact information, etc. Based upon the dynamic nature of the information presented, the programming that is to be presented to the residents is required to be updated regularly, for example, on a monthly, weekly, daily, or even hourly basis. Presently, such programming is generally implemented via a dedicated workstation situated within the accommodation area. Specifically, an operator is charged with tasks such as manually inputting the updated information, importing photographs, formatting video clips, etc. The resultant programming is a multimedia presentation that may be directly transmitted from the workstation as an audio/video feed to the monitors within the accommodation area.

However, creation of such programming may be time consuming and prone to editing errors, especially if only a single operator is responsible for creation of the programming. If the operator desires the information to be delivered in multiple forms (e.g., television, web site, print, etc.), then substantial duplicate data entry is required. Additionally, any changes to the current programming require that updates be made locally at the workstation. Furthermore, updates cannot be immediately implemented unless an operator or other qualified person is available on-site to access the workstation. A prior art software authoring tool and system for manual programming is the 2100 MWS Desktop System, the 2100/MWS Pro, the DeskTop 2000 System, the VCM 2000, and other related products offered by Visitor & Community Television Corporation, also known as VCTV. However, these software authoring tools and systems are not configured for Internet broadcasting. Additionally, the prior art software authoring tools and systems lack the ability to automate the design process used in creating the programming. Specifically, each time new content is provided for inclusion into the programming or existing content is altered, the programming is required to be manually changed by the operator. The addition, deletion and modification of such content may cause existing presentation elements to clash. For example, existing presentation elements may visually shift or newly introduced content may not fit within predefined areas of the existing programming. Therefore, the operator is required to review the entire programming and make the necessary modifications every time content is added, deleted or modified. Accordingly, additional resources (personnel, time and money) are expended each time a change is to be made to the programming.

Due to the non-Internet environment in which the audio/video feed is transmitted, the programming of prior art community-based television systems is limited to transmission and display to the monitors within the accommodation area. Therefore, persons not located in the accommodation area, but who have an interest in viewing the information presented within the accommodation area are precluded from doing so. Additionally, not presenting the accommodation area programming to an external audience limits marketing effectiveness. For example, lack of presentation of dynamic content, such as is found in brochures or static web sites, to families of residents or prospective residents or customers limits the perceived value of the accommodation area that may be conveyed to this audience.

Even if the content of the programming is presented outside of the accommodation area in a different medium, such as on a web site, the operator responsible for the programming would be required to possess knowledge of web site technology to import and format the content in the context of web accessible material. Alternatively, the accommodation area may contract with a web hosting/design company to provide such services. However, either of these options introduces additional cost and a possible lag time until the web site reflects the information presented in the programming currently shown on the televisions of the accommodation area. A prior art system for transmitting content on an enterprise-wide basis to both stand-alone televisions and Internet-connected displays is sold by Symon Communications, Inc., under the name of TargetVision (http://www.targetvision.com). However, such a system suffers from many of the aforementioned deficiencies including the absence of automatic presentation generation and the lack of integrating external content submission functionality.

Furthermore, with respect to printed calendars, the prior art requires that accommodation area staff manage an additional system, separate from that of the community-based television system. This additional system introduces increased labor costs and potential mismatches between the information listed on the printed calendar and that displayed to residents via the community-based television system.

SUMMARY OF THE INVENTION

To overcome the deficiencies of the prior art, what is needed, and has not heretofore been developed, is a system and method for efficient content creation, management and delivery of community information. The present invention is a community-based television system that offers remote content creation, automated layout and scheduling and customized programming delivery via a distributed communications network, such as the Internet. Implementation of the present invention results in efficient data input, output, manipulation, and management that is conducive to decreased lag time of presentation, decreased labor and maintenance costs, and improved accuracy. The automatic design aspects employed during the content creation lead to labor savings and ensure a high level of design quality, regardless of the experience/knowledge level attributed to an individual responsible for the customized programming. Accordingly, visually consistent and professional programming may be achieved. Furthermore, the present invention provides simultaneous or near-simultaneous delivery of programming presented within the community-based television system, to both residents and those outside the community, via web site integration and also in print. The first television presentation may be substantially similar to the web presentation or the first television presentation may be different from the web presentation such that the web presentation omits content designated as private.

The present invention is a method for providing community information concerning an accommodation area including the steps of (a) inputting community information of the accommodation area to a storage medium; (b) creating a television presentation and a web presentation using software, wherein the software imports the community information from the storage medium and automatically formats and lays out the community information into the television presentation and the web presentation; (c) optionally applying presentation elements having user-modifiable rules associated therewith to the television presentation and the web presentation; (d) transmitting the television presentation to the accommodation via a distributed communications network; and (e) optionally displaying the web presentation on a web site associated with the accommodation area.

A database may be communicatively connected to the software and may be configured to store a plurality of presentation elements, such as a background template; title text with font and layout specifications; description text with font and layout specifications; location text with font and layout specifications; time and date text with font and layout specifications; and an audio component. One or more of the plurality of presentation elements may be applied to the first television presentation and the web presentation.

A user-modifiable rule may be associated with one or more of the presentation elements. The user-modifiable rule may be operative for determining when the presentation element appears in the first television presentation and/or the web presentation; how long the presentation element appears in the first television presentation and/or the web presentation; whether an audio component is to be played in at least one of the first television presentation and web presentation; a schedule for presenting the presentation element on a repeated basis; and if the presentation element appears in (a) the first television presentation; (b) the web presentation; (c) both the first television presentation and the web presentation; or (d) printed media.

The software may be configured to dynamically insert a linked object into the first television presentation and/or the web presentation. Accordingly, content associated with the dynamically linked object may be automatically retrieved such that continually updated data may be displayed in connection with the first television presentation and/or the web presentation. The present invention also provides for the ability to automatically format and lay out the community information and the presentation elements into a representation of printed media, such as a calendar.

Optionally, a second television presentation may also be created using the software, wherein the software imports the community information from the storage medium and automatically formats and lays out the community information into the second television presentation. Thereafter, the second television presentation may also be transmitted to the accommodation area via the distributed communications network. The first and second television presentations may then be viewed on a first and second television channel, respectively, of the accommodation area. The web presentation may also be viewed within the accommodation area.

A system for implementing the aforementioned method is also provided. Generally, such a system for providing community information includes a server configured to be communicatively connected to a distributed communications network. A database may be communicatively connected to the server, wherein the database is configured to store the presentation elements. A storage medium may be communicatively connected to the server, wherein the storage medium is configured to store the community information. The server also includes software operative for (a) importing the community information from the storage medium; (b) automatically formatting and laying out the community information into a television presentation and a web presentation; (c) retrieving the presentation elements stored in the database; (d) automatically applying at least one of the presentation elements to the television presentation and the web presentation; and (e) transmitting the television presentation and, optionally, the web presentation via the distributed communications network to an accommodation area and a web site, respectively.

It is envisioned that the present invention serves as a community-based technology for the senior living industry; however, it is to be understood that the present invention may be utilized in any accommodation area including those previously serviced by prior art community-based television systems. The present invention allows for the creation of stronger connections with family and friends and the community as a whole. Thus, the present invention also serves the purpose of increasing marketing opportunities. For example, in the context of the senior living industry, providing real-time and updated information relating to a particular residential community can be beneficial in creating an interest from prospective residents for that particular residential community.

These and other advantages of the present invention will be understood from the description of the preferred embodiments, taken with the accompanying drawings, wherein like reference numerals represent like elements throughout.

BRIEF DESCRIPTION OF THE DRAWINGS

FIG. 2b is a screenshot of the web page associated with the residential community depicting a slide show presentation;

DETAILED DESCRIPTION OF THE PREFERRED EMBODIMENTS

The present invention will now be described with reference to the accompanying figures. It is to be understood that the specific system illustrated in the attached figures and described in the following specification is simply an exemplary embodiment of the present invention.

Figure 1:
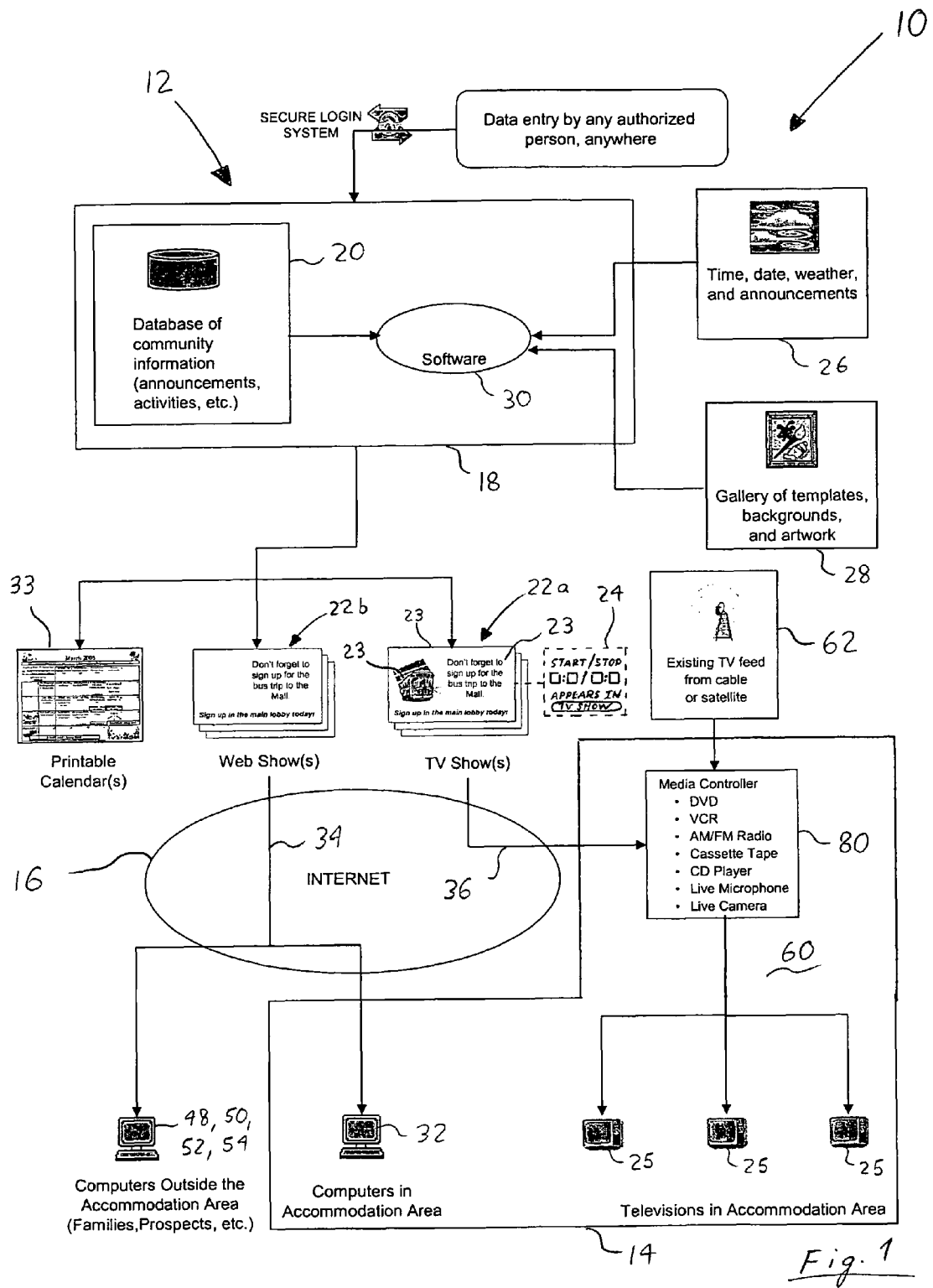
FIG. 1 is a schematic view of the entities and communications links involved in a community-based television system in accordance with the present invention.

With reference to FIG. 1, the entities and the communicative connectivity between the entities of a community-based television system 10 are shown in accordance with a desirable embodiment of the present invention. Generally, the community-based television system 10 includes a service provider 12 for generating community-based programming and at least one programming recipient 14 for receiving the community-based programming via a distributed communications network, such as the Internet 16. It is to be understood that the communicative connectivity internal to the service provider 12 and the programming recipient 14 may include other networking infrastructures such as local area networks, including wired and/or wireless local area networks.

The service provider 12 operates a server 18 communicatively connected to a database 20. As is known in the art, the server 18 may include suitable input devices (e.g., keyboard, mouse, etc.) and suitable digital storage devices (e.g., hard drives, optical drives, etc.). The digital storage devices may contain the database 20. It is to be understood that the server 18 and/or the database 20 may be either locally or remotely located with respect to the service provider 12. Thus, the server 18 and/or the database 20 do not necessarily need to be located at the physical location of the service provider 12. The service provider 12 is responsible for the creation of programming and the distribution thereof to the programming recipient 14. The service provider 12 may also be responsible for providing and implementing the infrastructure necessary to support the delivery of programming to a location of the programming recipient 14.

The programming recipient 14 is an entity providing an accommodation area or areas for a segment of the population, either specialized or generalized. The programming recipient 14 may include, but is not limited to, a residential community, a hospital, an airport, a hotel, and a school in which in-house programming is desired to be transmitted through a closed-circuit television environment to multiple television monitors within the accommodation area. For exemplary purposes, the accommodation area that will be discussed in connected with the present invention is a senior residential community, which may include a nursing home, assisted living community, independent living community, and combinations or derivatives thereof. However, it is to be understood that the present invention may be adapted and applied in the context of any of the aforementioned accommodation areas but not strictly limited thereto. The programming recipient 14, for example, the residential community 14, may enter into a servicing contract with the service provider 12 for the service provider to create and deliver customized programming to the residential community 14.

The customized programming generally includes, but is not limited to, a presentation, such as a television show and/or a web show, otherwise known as a television presentation 22a and a web presentation 22b, respectively. The presentations 22a, 22b may be slide shows, displaying dynamic content pertinent to the function of, activities occurring in, and operational aspects relating to the residential community 14. For example, the presentations 22a, 22b may include, but are not limited to, an activities calendar, dining menus, announcements, photographs, videos, and contact information. A typical slide show may include a single screen of information, a series of screens of information, a sequence of animation or video, or a combination thereof. The presentations 22a, 22b are intended to be viewed by residents, staff, and/or other persons within the residential community 14, generally, on one or more of television monitors 25 situated in the residential community 14. Because the information shown in the presentations 22a, 22b may change or may no longer be applicable at any given moment due to newly implemented scheduling changes at the residential community 14, the community-based television system 10 is required to provide dynamic content creation and programming delivery to the residential community 14.

To this end, the database 20 is configured to store the data corresponding to the informational content ultimately displayed on the television monitors 25 in the residential community 14. For example, the database 20 may include the most recent activities calendar, dining menus, announcements, photographs, videos and contact information. Additionally, the database 20 may include marketing material that, for example, is used to promote the residential community 14 or present third-party advertising to the residents. The database 20 may be updated by input received from the programming recipient 14, through electronic communication, oral communication (e.g., telephonically) or postal mail. The service provider 12 may include automatic update functionality for the database 20 by allowing the residential community 14 direct access to the database 20. For example, an authorized representative of the residential community 14 may access a web site (not shown) operated by the service provider 12, which allows the authorized representative to enter scheduling information or update other data via a user interface or form. Specific server side software may be implemented to provide an administrator's interface. The database 20 may be configured to process the inputted data and update the contents of the database 20, accordingly. It is to be understood that the server 18 may utilize appropriate password protection and hacker resistant authentication protocols, such as SSL, to ensure only authorized access to the database 20. The web site may either be remote from or local to the server 18.

The server 18 may be communicatively connected to local or remote databases offering content that may be incorporated into any of the presentations 22a, 22b. For example, a weather database 26 may provide forecast information and an art gallery database 28 may provide a variety of pre-loaded illustrations and graphic images. The content of these additional databases may alternatively be stored locally on the database 20. Therefore, in addition to accommodating updates relating to informational content, the database 20 may be configured to accept multimedia content uploads. For example, the art gallery database 28 may be configured to import additional pictures from a variety of sources including, but not limited to, digital cameras, camera phones and the Internet 16. These pictures may be submitted by the service provider 12, the authorized representative of the residential community 14 and the residents. Accordingly, it is to be understood that the service provider 12 is not limited in the type of content that may be received by the server 18 and stored in the database 20.

Software 30 operating on the server 18 may then be used to create the presentations 22a, 22b based upon the various content available to the service provider 12. Software, such as application software, may include a television show generator and a web show generator. It is to be understood that these generators may both be integrated into the software 30, or may be individual components or plug-ins. The presentations 22a, 22b may each be designed as a series of individual slides configured to be displayed in a predefined or even random order. It is to be understood that the software 30 may include intuitive editing functions that are either automatically implemented or provide the user with flexible editing capabilities. For example, any given slide having a great amount of text may be automatically split into two or more consecutive slides. Additionally, summary slides may be created that provide a quick summary of several individual slides. The slides may be automatically created based upon information provided by the residential community 14 or existing information residing in the database 12. For example, the software 30 may be configured to automatically select appropriate illustrations from the art gallery database 28 and properly arrange the text and selected illustrations within a particular slide or screen. Background music may be added to any aspect of the presentations 22a, 22b from either local or remote music libraries. The use of templates and predefined design rules simplifies data input and layout thereof. It is to be understood that the term "automatically" is to be construed to mean autonomously, such that unlike the prior art, no user interaction is necessarily required in order to format and layout the community information and/or the presentation elements into the presentation 22a, 22b. Of course, it is also to be understood, that a user may manually format and layout community information and/or the presentation elements via flexible editing capabilities provided by the software 30.

The software 30 may offer the user the ability to complete specified fields and/or answer a series of questions during the presentation creation process. This allows for customization of the presentations 22a, 22b without requiring the user to delve into abstract and complex design methodologies. Each of the presentations 22a, 22b may include one or more presentation elements 23, such as a background template, title text, description text, location text, and time and date text, each having modifiable font and layout specifications associated therewith. The presentation element 23 may also encompass an audio component (e.g., narration, music, sound effects) or video component. Each presentation element 23 may include a user-modifiable rule associated therewith. The rule may be a characteristic or parameter for adjusting various aspects of the presentation element 23 as they relate to the overall presentations 22a, 22b. Exemplary rules 24 may be operative for determining (a) when the presentation element 23 appears in any of the presentations 22a, 22b; (b) how long the presentation element 23 appears in any of the presentations 22a, 22b; (c) if the presentation element 23 appears in one or both of the presentations 22a, 22b and/or in printed media, such as a calendar; (d) whether or not an audio component is to be played or what audio component is to be played in any of the presentations 22a, 22b; and (e) a schedule for presenting (e.g., displaying) the presentation element 23 on a repeated basis.

It is to be understood that although reference to "slides" is made herein, the present invention is not to be construed in the sense of slide creation as is done in a PowerPoint® presentation, for example. In fact, in contrast to a PowerPoint® presentation, the "slides" created in the present invention need neither be created nor presented in a linear sequence. This design and display methodology equally applies to the individual presentation elements 23. For example, the rules 24 may be implemented to delay the introduction of a graphic after a predefined amount of time has lapsed after the appearance of text. However, the graphic may not be appropriate for display on the web site and, therefore, the graphic may have a rule 24 associated with it that dictates that the graphic only be displayed in connection with the presentation 22a such that the graphic is only viewable in the residential community 14. Additionally, it may be the case that the presentation 22b displayed on the web site is more marketing oriented and, therefore, does not need to present the "slides" in the same order or with the same degree of repetition as that in the residential community 14. Accordingly, the rule 24 associated with the graphic and text may dictate that these presentation elements be displayed every five minutes, for example, with respect to the presentation 22a, but only every twenty minutes, for example, with respect to the presentation 22b. Therefore, unlike in a PowerPoint® presentation, each presentation 22a, 22b of the present invention is non-linear in display, such that it is possible to "jump" from "slide" to "slide" depending on the scheduling rules associated with each "slide." Additionally, the presentation elements 23 are not tied to individual slides, as display (timing, duration, layout, etc.) of the presentation elements 23 may be independent of any specific "slide" that is shown. Accordingly, use of the modifiable rules 24 offers flexibility and ease of use to the individual creating the presentations 22a, 22b.

Non-exhaustive tools that may be utilized in the creation of the presentations 22a, 22b include an editor to modify the various rules, visual layout, methods of modifying the amount of time a slide is displayed, methods of specifying transitions between slides, and methods of inserting audio narration into the presentations 22a, 22b. For example, the audio narration functionality is provided to permit staff of the residential community 14 to dictate an audio portion that is to be played concurrently with the display of the corresponding slide. It is to be understood that audio components may encompass a variety of other sources including, but not limited to, music files and sound effects that may be loaded into the presentation by a user either locally or remotely from the server 18. The display of announcements, emergency or otherwise, may be configured to "crawl" along a bottom portion of a slide or throughout any other portion of the presentation. The software 30 may encompass a media scheduler application that may be used for playing movies at a specified date and time. One having ordinary skill in the art would understand the features inherent in slide show presentation software and, therefore, these features will not be discussed in greater detail herein. Constantly changing data, such as weather forecast data, may be embedded as a dynamically linked object within the presentations 22a, 22b. Accordingly, the service provider 12 is primarily responsible for data input, output, manipulation and management that results in the presentations 22a, 22b to be delivered to the residential community 14.

Additional software may be configured to allow remote creation of the presentations 22a, 22b. Specifically, online editing, via either a web-based user interface or proprietary software, allows residents, staff, or other authorized personnel to redesign and modify the presentations to their liking. It is to be understood that access controls and user-based restrictions may be implemented to allow presentation modification by various parties only to the extent that they are each authorized. The residential community 14 may also include one or more computers 32 communicatively connected to the Internet 16, which allow the residents and staff to modify the presentations 22a, 22b.

Additional or integrated functionality of existing software (e.g., print generator software) operating on the server 18 may be utilized to present activity and scheduling data in the form of printed media, such as a calendar 33, thus also distributing some of the content in print form. Residents accessing the server 18 may select from various calendar formats and print the calendar for their personal use or the calendars may be generated and printed by the staff of the residential community 14. Furthermore, the software may be configured to allow residents, families and members of the public to view, browse, search and sign up for specified activities. Essentially, the server 18 provides access to a community web-based interactive calendar. Because the service provider 12 has access to the contents of the database 20, the service provider 12 can also manage activity resources (e.g., rooms, staff, equipment) of the residential community and detect any conflicts in scheduling or availability via activity resource management software. Routines may be implemented which immediately correct any scheduling conflicts or contact appropriate personnel at the residential community 14 to further inquire into and resolve the scheduling conflicts. It is to be understood that any updates made to the database 20 may be immediately reflected in the presentations 22a, 22b. Alternatively, new presentations incorporating updated content may be transmitted by the server 18 at scheduled intervals.

The delivery of the presentations 22a, 22b to the residential community 14 will now be discussed. After creation of the presentations 22a, 22b, the server 18 creates an Internet web data stream 34 and an Internet television data stream 36, respectively. The Internet web data stream 34 is directed to and accessible by personal Internet-capable communications devices, whereas the Internet television data stream 36 is directed to and accessible by the in-house television monitors 25 of the residential community 14.

Figure 2A:
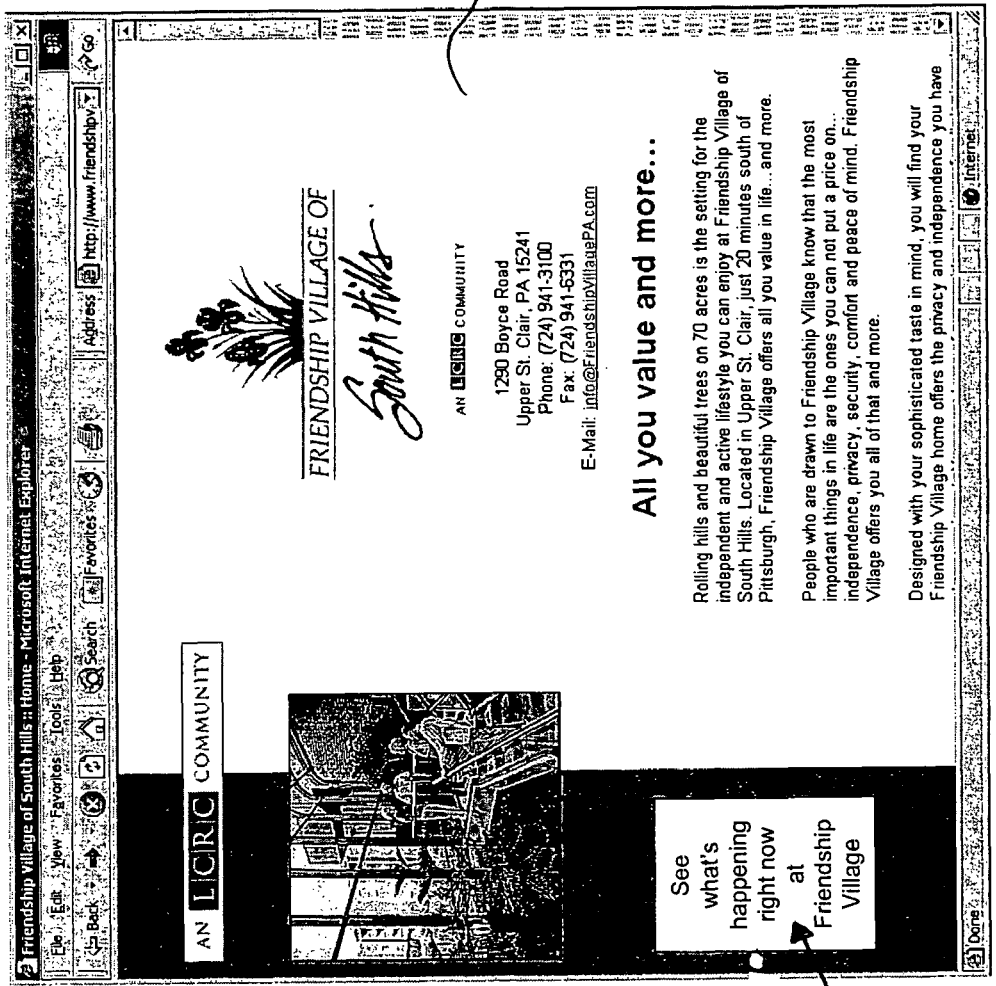
FIG. 2a is a screenshot of a web page associated with a residential community providing a link to dynamic community-based content.

Specifically, the web show 22b may be stored on a server, such as the server 18, to be viewed in connection with a web site. For example, with reference to FIGS. 2a and 2b and with continuing reference to FIG. 1, an exemplary web page 40 of a web site associated with the residential community 14 is shown in a standard browser window. In addition to offering static content 42, the web page 40 provides a link 44 that, when activated, for example, opens a new window 46 or overlay that is used to display the presentation 22b. Alternatively, it may be the case that the presentation may automatically be displayed after the web page 40 is accessed. Therefore, no additional user interaction (e.g., clicking) with the web page 40 may be required. It is to be understood that the aforementioned web page layout is to be considered an exemplary layout only and that other suitable web page layouts and display methodologies may be implemented.

In a desirable embodiment, the presentations 22a, 22b are displayed "live" such that the presentation 22a transmitted with the Internet television data stream 36 is contemporaneously shown with the presentation 22b transmitted with the Internet web data stream 34. Of course, it is to be understood that inherent Internet and other network lag time and bandwidth limitations may preclude precise contemporaneous delivery of both data streams 34, 36 with respect to each other. There may also be intentional delayed or scheduled delivery associated with each of the presentations 22a, 22b. Furthermore, the substantive content of the Internet web data stream 34 may be different than the Internet television data stream 36. It may be the case that the Internet television data stream 36 may contain content that is inappropriate (e.g., private) to display on the web site or to the public outside of the residential community 14. As another example, the Internet web data stream 34 may contain marketing or promotional information that is intended to be shown only on the web site, but not on the in-house television monitors 25. Therefore, it is to be understood that the software 30 operating on the server 18 may be used to create custom-tailored content and layout depending on the whether the content is to be viewed internally or externally of the residential community 14.

Due to the fact that the presentation 22b may be accessible via a web site, it is envisioned that any computer communicatively connected to the Internet 16 may view the presentation 22b. Accordingly, the residents' computers 32, respective families' computers 48, prospective residents' computers 50, staff computers 52, and public access computers 54 are able to access the presentation 22b. It is to be understood that the system may be configured such that the presentation 22a may also be viewed on the residents' computers 32 within the residential community 14. The resultant exposure to the activities, functions, and operational aspects of the residential community 14 increases the view of vitality of the residential community 14 to the outside world. Additionally, family members and friends may be quickly informed in real time of the social happenings of their loved ones.

Figure 3:
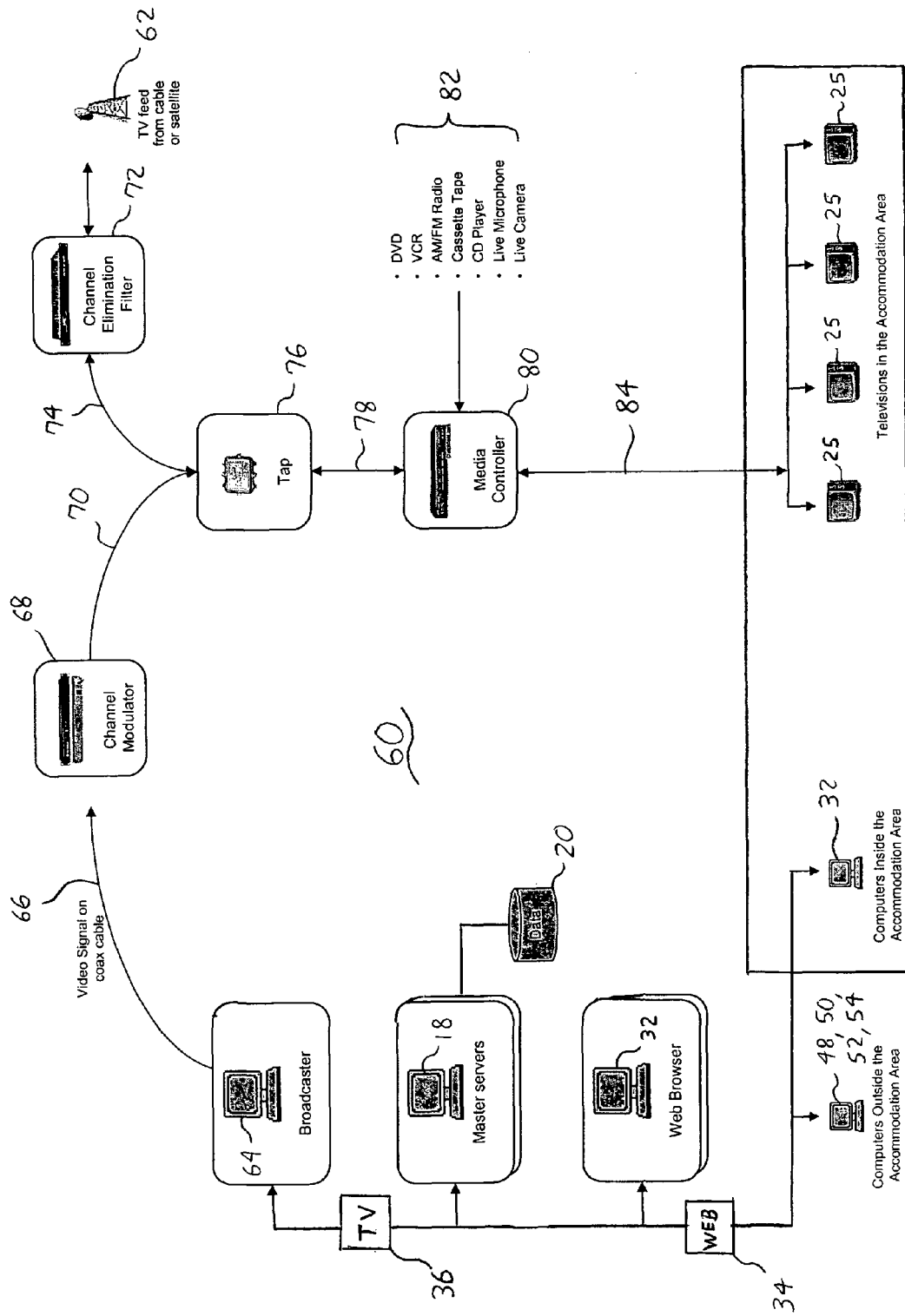
FIG. 3 is a schematic view depicting the delivery of the slide show presentation within the residential community.

With reference to FIG. 3 and with continuing reference to FIG. 1, the delivery of the presentation 22a within the residential community 14 will now be discussed. In a desirable embodiment, an in-house television network 60 is configured to provide audio and visual services via the television monitors 25 situated within the residential community 14. Desirably, each resident's room includes one of the television monitors 25; however, it is to be understood that the television monitors 25 may also be placed in public, social and staff areas as well. Typically, the television monitors 25, via the in-house television network 60, are configured to display an existing television feed 62 from cable or satellite. Therefore, a variety of broadcasting channels are available for viewing. With respect to the community-based television system 10, at least one channel of the television monitor 25 is reserved for displaying the presentation 22a. Thus, it is to be understood that the present invention may simultaneously broadcast on several channels with each channel serving a different segment of the population within the residential community 14.

The in-house television network 60 includes a "broadcaster" component 64 configured to convert the incoming Internet television data stream 36 transmitted by the server 32 into a corresponding audio and video signal 66 that is compatible with the in-house television network 60. Desirably, the broadcaster 64 is embodied as a server computer having an Internet interface and a video card and audio card with respective output ports. Generally, the digitally compressed data containing the audio and video portions of the presentation 22a are received at the Internet interface and are then converted by the broadcaster 64 into corresponding analog audio and video signals. The audio and video signals 66 may then be transmitted from the broadcaster 64 through the video output ports thereof via a coaxial cable to a channel modulator 68. The channel modulator 68 is configured to adjust the frequency of the audio and video signals 66 to match any specified channel on the television monitors 25. Accordingly, a modulated audio and video signal 70 is transmitted from the channel modulator 68. A channel elimination filter 72 may be placed in-line to block a specified channel in the existing television feed 62 from cable or satellite, such that a channel of each of the television monitors 25 may be reserved for displaying the presentation 22a. Accordingly, a filtered existing television feed 74 is transmitted from the channel elimination filter 72. The modulated audio and video signal 70 and the filtered existing television feed 74 are received by a tap 76 that merges the two signals into a combined signal 78. The combined signal 78 may be transmitted to a media controller 80. The media controller 80 may be configured to switch between television and other media sources 82. Such media sources 82 may include, but are not limited to, a DVD, VCR, AM/FM radio, cassette tape deck, compact disc player, live microphone and live video camera. Authorized residents or staff may use the media controller 80 to add additional content to the presentation 22a at a local level. For example, a resident may add voice-commentary and music, via the microphone and compact disc player, respectively, to a series of images taken during a social outing of the residential community 14. A final signal 84 is transmitted to a specified channel on the television monitors 25.

FIGS. 4-9 depict various exemplary configurations of the community-based television system 10. For example, based upon the specific needs of a residential community 14 and the existing television network infrastructure of the residential community 14, a customized configuration of the community-based television system 10 may be implemented.

Figure 4:
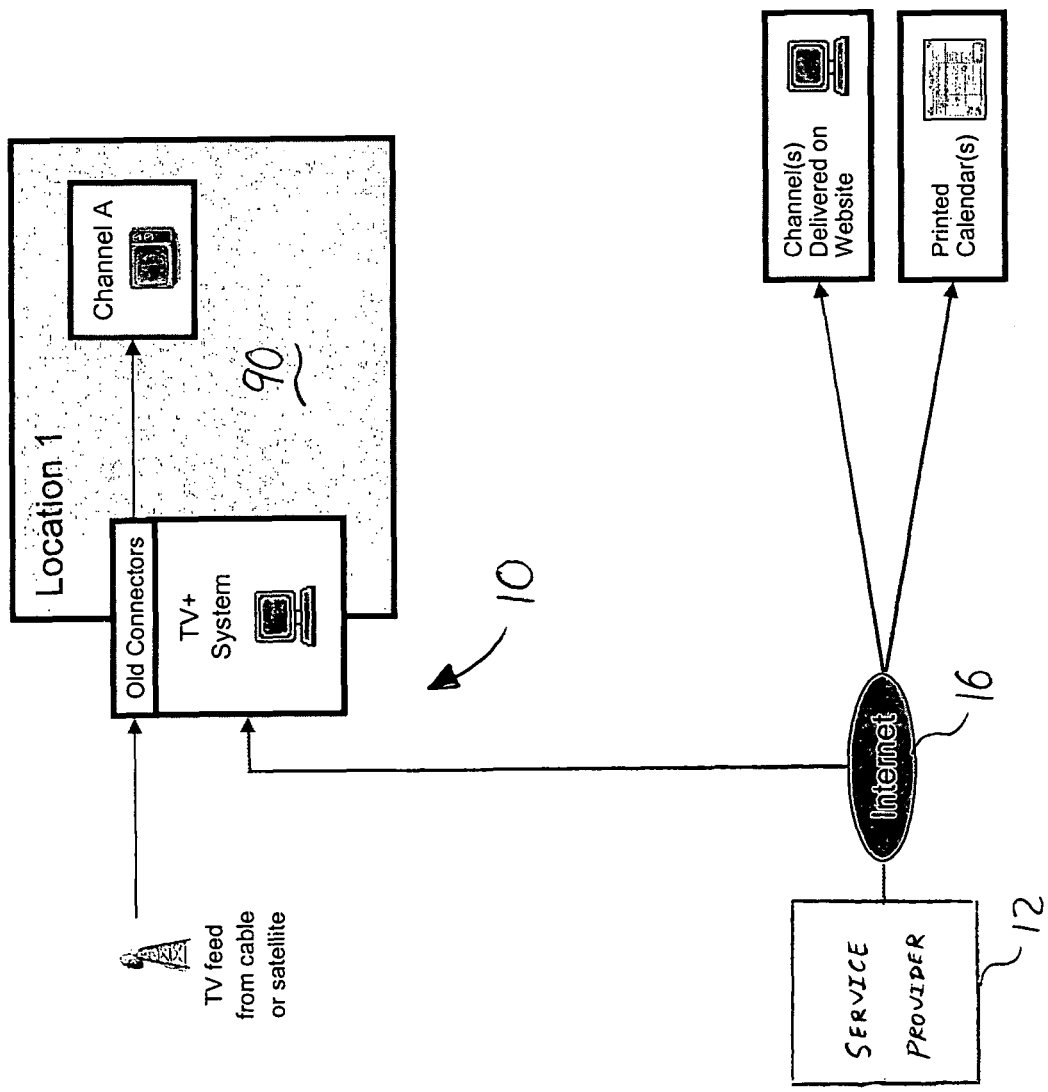
FIG. 4 is a schematic depicting the community-based television system configured in an existing in-house television system.

FIG. 4 depicts the community-based television system 10 configured in an existing in-house television system 90. For example, the community-based television system 10 services a single location and transmits the presentation 22a on only one channel. No modifications are necessary because the in-house television system 90 utilizes existing television networking components such as the channel modulator 68, channel elimination filter 72, etc. The presentation 22b may also be concurrently delivered on a web site.

Figure 5:
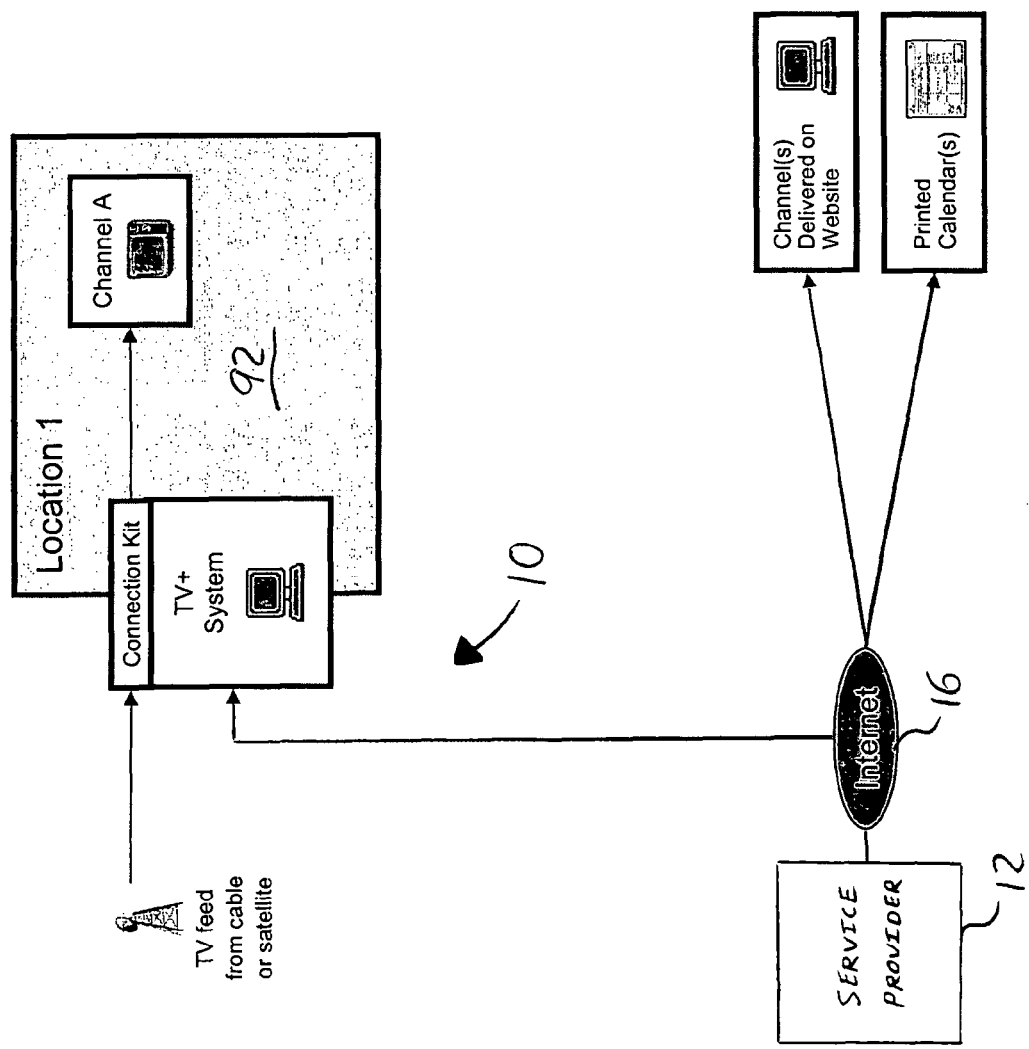
FIG. 5 is a schematic depicting the community-based television system configured as a new installation.

FIG. 5 depicts the community-based television system 10 configured as a new installation 92. For example, the community-based television system 10 also services a single location and transmits the presentation 22a on only one channel. However, due to the new installation 92, television networking components, such as the channel modulator 68, channel elimination filter 72, etc., are supplied to the residential community 14 by the service provider 12. These television networking components may be embodied as a connection kit. It is to be understood that those having ordinary skill in the art would appreciate the components included in the connection kit to implement video networking in various applications and settings. The presentation 22b may also be concurrently delivered on a web site.

Figure 6:
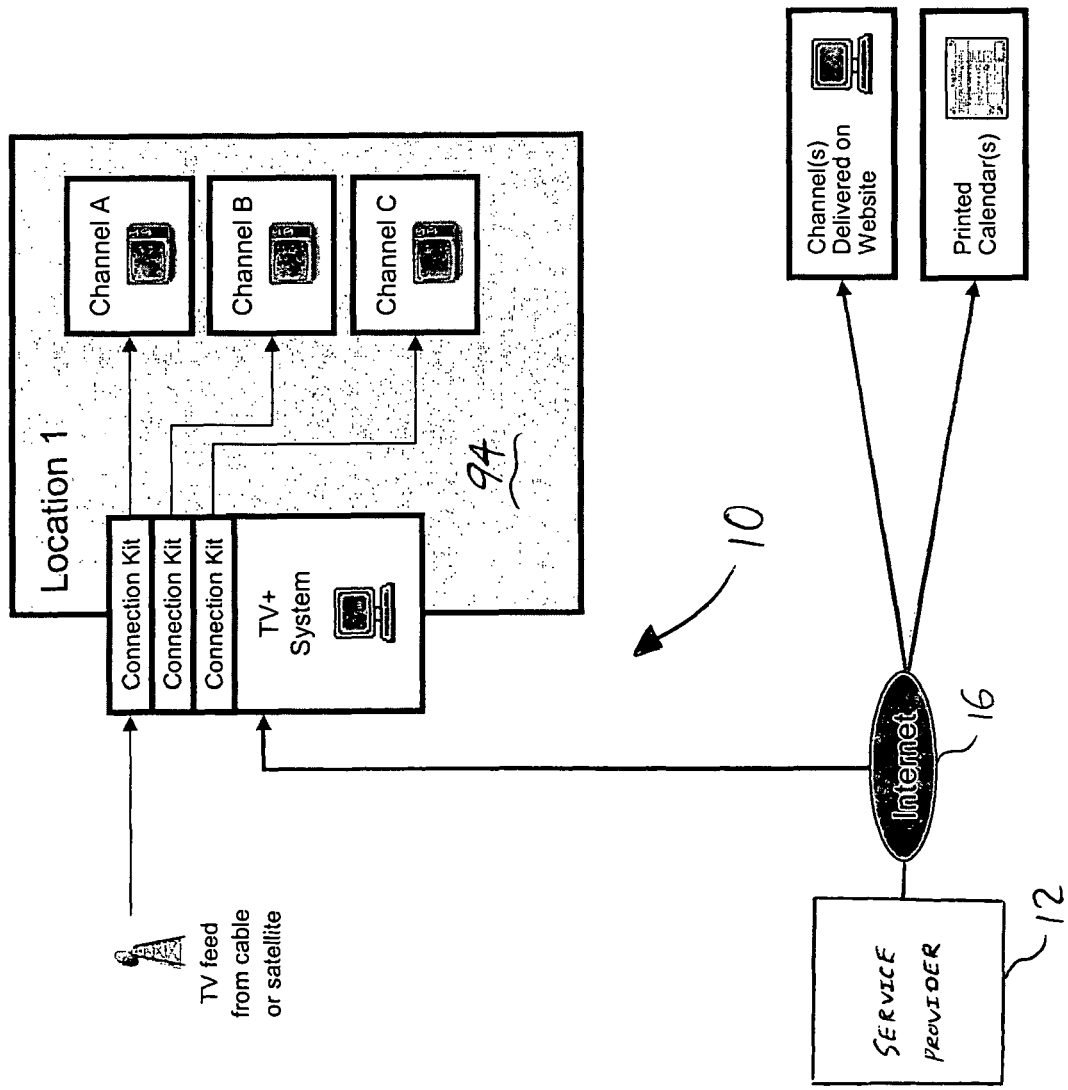
FIG. 6 is a schematic depicting the community-based television system configured as a multiple channel implementation serving a single location.

FIG. 6 depicts the community-based television system 10 configured as a multiple channel single location implementation 94. For example, the community-based television system 10 may simultaneously transmit three different presentations 22a by utilizing three separate channels. This particular multiple channel single location implementation 94 allows three different types of target audiences to be reached within the same location and, therefore, requires utilizing additional connection kits. The simultaneously transmitted presentations 22b may also be concurrently delivered on a web site as corresponding multiple data streams.

Figure 7:
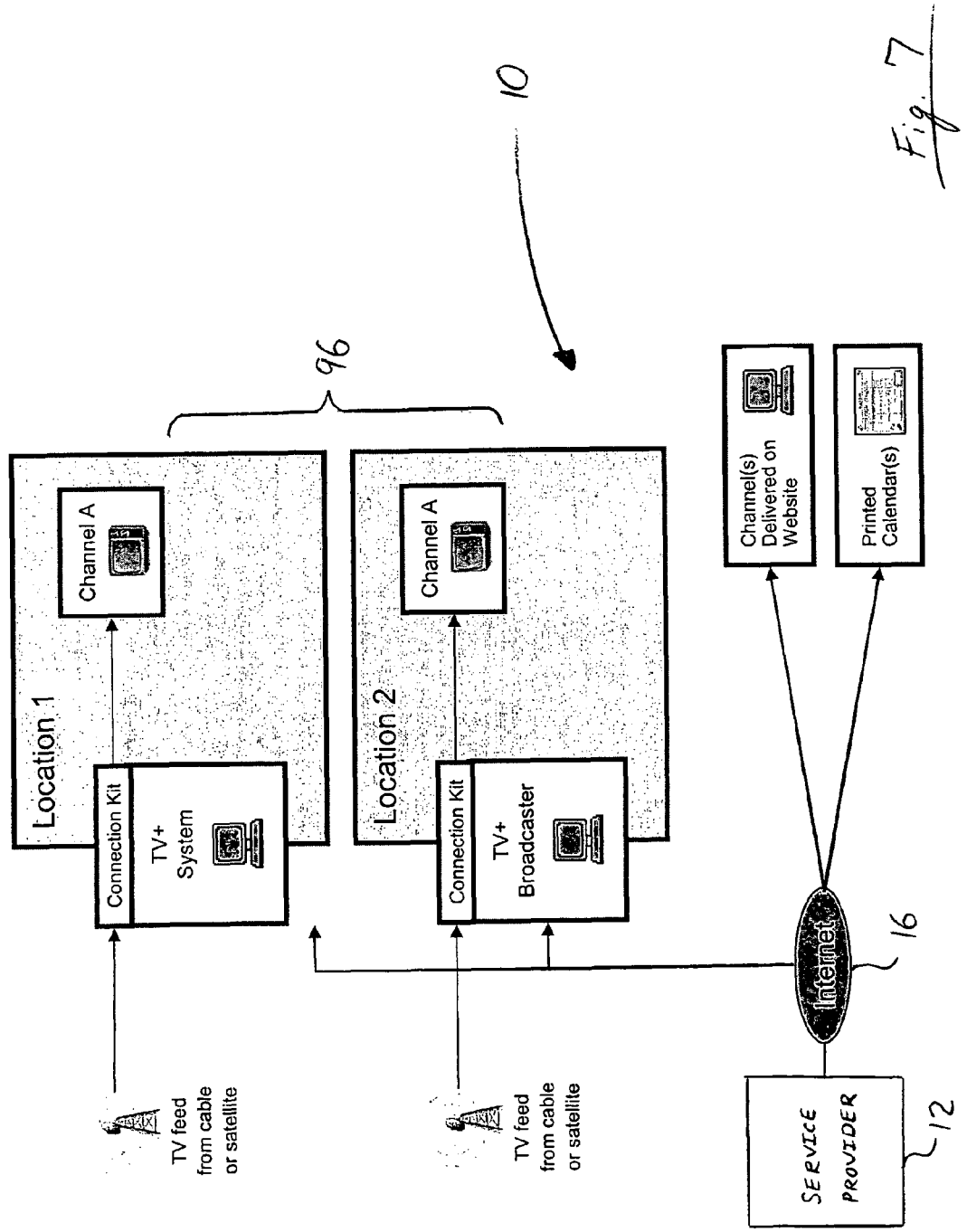
FIG. 7 is a schematic depicting the community-based television system configured as a single channel implementation serving multiple locations.

FIG. 7 depicts the community-based television system 10 configured as a single channel multiple location implementation 96. For example, the community-based television system 10 may transmit the same presentation 22a to two separate locations within the residential community 14. This particular single channel multiple location implementation 96 requires an additional broadcaster 64 and two connection kits. The presentation 22b, which may be identical in each of the separate locations, may also be concurrently delivered on a web site as a single data stream.

Figure 8:
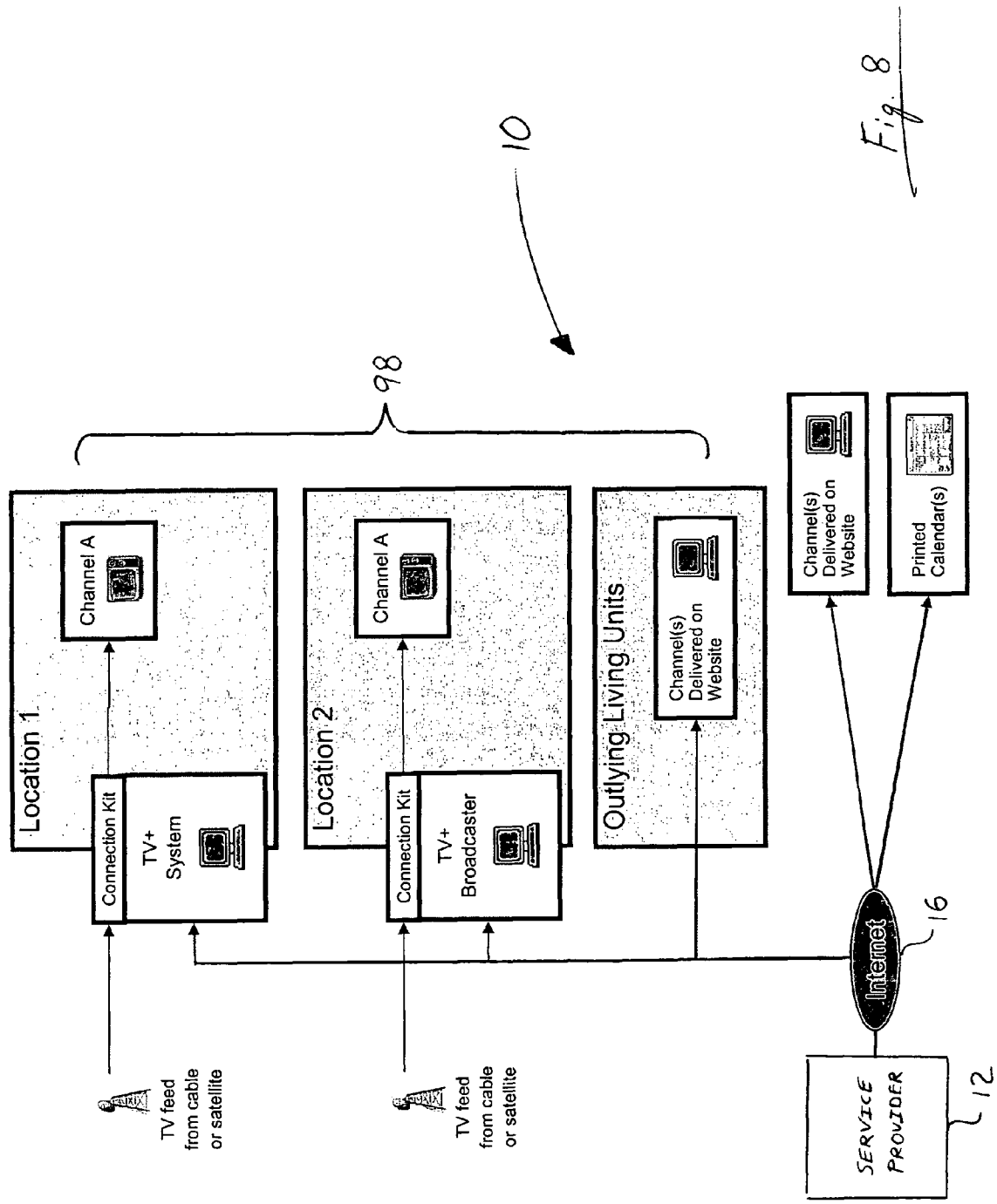
FIG. 8 is a schematic depicting the community-based television system configured as a single channel implementation serving multiple locations having multiple output devices.

FIG. 8 depicts the community-based television system 10 configured as a single channel multiple location multiple output devices implementation 98. For example, the community-based television system 10 may transmit the same presentation 22a to three separate locations within the residential community 14. However, each of the locations may include different output devices for viewing the presentation 22. Thus, each of the separate locations in which the presentation will be viewed may requires the connection kit, as previously discussed. However, no connection kit may be necessary if a location utilizes an Internet connected computer to view the presentation 22b. The presentation 22b, which may be identical in each of the separate locations, may also be concurrently delivered on a web site as a single data stream.

Figure 9:
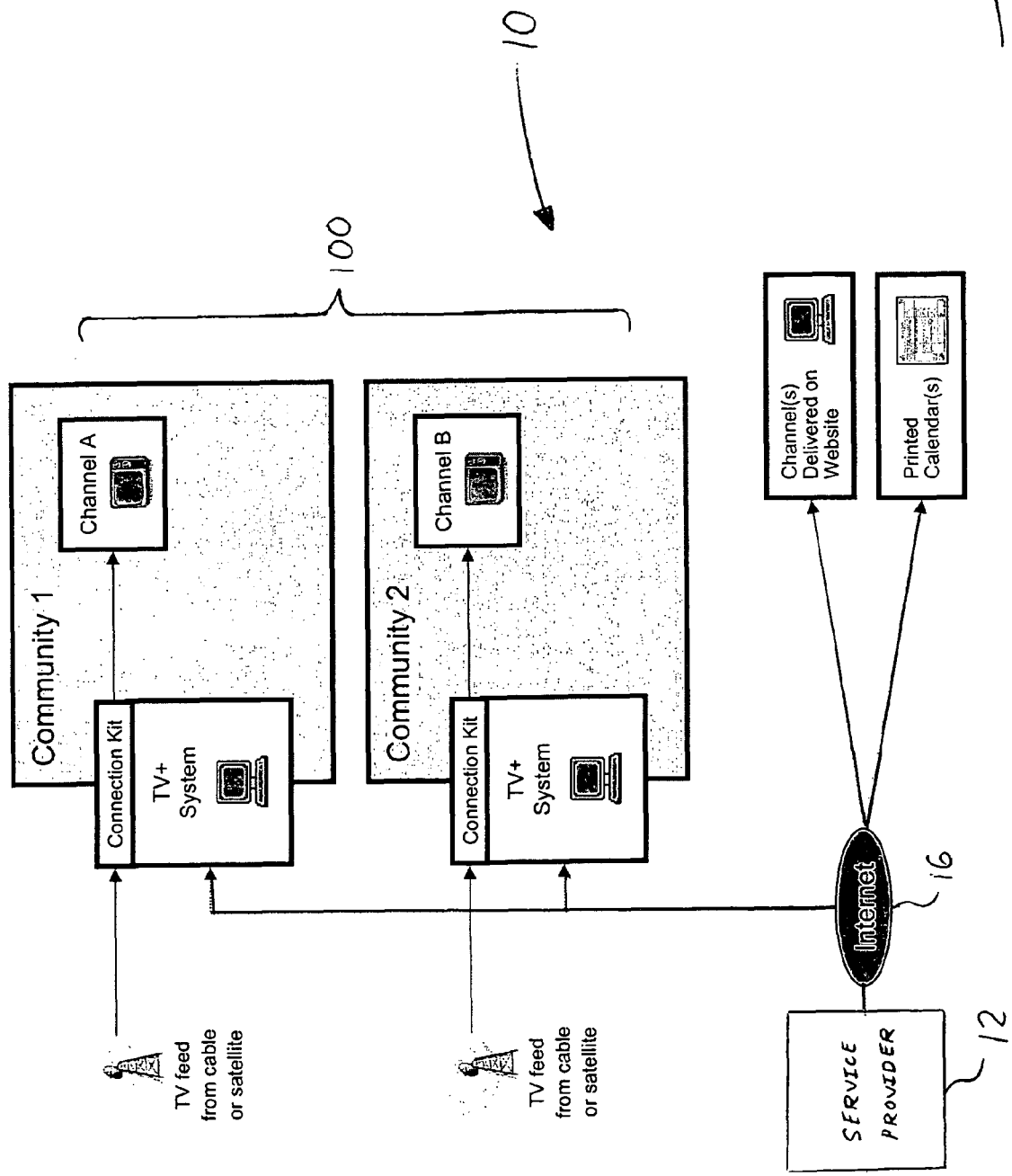
FIG. 9 is a schematic depicting the community-based television system configured as a multiple community implementation.

FIG. 9 depicts the community-based television system 10 configured as a multiple community implementation 100. For example, the community-based television system 10 may transmit a different presentation 22a to two different residential communities. This particular multiple community implementation 100 requires a connection kit for each of the residential communities. Each residential community may have its own web site. Accordingly, the presentations 22b may be concurrently delivered on the respective web site of each of the residential communities. This multiple community implementation is representative of the ability of the service provider 12 to service multiple residential communities via Internet connectivity and implementation of an appropriate configuration of the community-based television system 10 for each of the residential communities.

It is to be understood that the service provider 12 may offer additional services including, but not limited to, email services, games, discussion forums, resident directories, and other online tools for residents of the residential community 14. Additionally, it is envisioned that the service provider 12 may provide installation and support services to the residential community 14 relating to the community-based television system 10. Training sessions and software/hardware upgrades may also be provided by the service provider 12.

The above invention has been described with reference to the preferred and alternative embodiments. Obvious modifications, combinations and alterations will occur to others upon reading the preceding detailed description. It is intended that the invention be construed as including all such modifications, combinations, and alterations insofar as they come within the scope of the appended claims or the equivalents thereof.

The invention claimed is:

1. A method for providing community information concerning an accommodation area, the method comprising the steps of:

inputting community information to a storage medium, wherein the community information pertains to the accommodation area;

creating a first television presentation using software, wherein the software imports the community information from the storage medium and automatically formats and lays out the community information into the first television presentation;

transmitting the first television presentation to the accommodation area via a distributed communications network;

creating a web presentation using the software, wherein the software imports the community information from the storage medium and automatically formats and lays out the community information into the web presentation; and displaying the web presentation on a web site.

2. The method of claim 1, further comprising the step of creating a second television presentation using the software, wherein the software imports the community information from the storage medium and automatically formats and lays out the community information into the second television presentation.

3. The method of claim 2, further comprising the steps of:
transmitting the second television presentation to the accommodation area via the distributed communications network; and
viewing the first and second television presentations on a first and second television channel, respectively, of the accommodation area.

4. The method of claim 2, further comprising the step of transmitting the second television presentation to another accommodation area via the distributed communications network.

5. The method of claim 1, further comprising the step of viewing the web presentation from within the accommodation area.

6. The method of claim 1, wherein the first television presentation is substantially similar to the web presentation.

7. The method of claim 1, wherein the first television presentation is different from the web presentation such that the web presentation omits content designated as private.

8. The method of claim 1, wherein the web site is associated with the accommodation area.

9. The method of claim 1, wherein the accommodation area is one of a residential community, a hospital, an airport, a hotel, a school, a house of worship, a nursing home, and a retirement community.

10. The method of claim 1, further comprising the steps of:
retrieving a plurality of presentation elements stored in a database communicatively connected to the software, and
automatically applying at least one of the plurality of presentation elements to the first television presentation and the web presentation.

11. The method of claim 10, wherein the presentation elements are at least one of:
a background template;
title text with font and layout specifications;
description text with font and layout specifications;
location text with font and layout specifications;
time and date text with font and layout specifications; and
an audio component.

12. The method of claim 10, further comprising a user-modifiable rule associated with one or more of the presentation elements, wherein the rule is operative for determining one of:

when the presentation element appears in at least one of the first television presentation and the web presentation;
how long the presentation element appears in at least one of the first television presentation and the web presentation;
if the presentation element appears in:
the first television presentation;
the web presentation;
both the first television presentation and the web presentation; or
printed media;
whether an audio component is to be played in at least one of the first television presentation and web presentation; and
a schedule for presenting the presentation element on a repeated basis.

13. The method of claim 10, further comprising the step of:
inserting a dynamically linked object into at least one of the first television presentation and web presentation; and
retrieving content associated with the dynamically linked object such that one of the first television presentation and web presentation contains continually updated data.

14. The method of claim 10, further comprising the steps of:
retrieving the community information from the storage medium;
automatically formatting and laying out the community information into a representation of printed media; and
automatically formatting and laying out the presentation elements into the representation of printed media.

15. A system for providing community information, comprising:
a server configured to be communicatively connected to a distributed communications network;
a database communicatively connected to the server, wherein the database is configured to store a plurality of presentation elements;
a storage medium communicatively connected to the server, wherein the storage medium is configured to store community information; and
software operative on the server for:
importing the community information from the storage medium;
automatically formatting and laying out the community information into a television presentation and a web presentation;
retrieving the plurality of presentation elements stored in the database;
automatically applying at least one of the plurality of presentation elements to the television presentation and the web presentation; and
transmitting the television presentation and the web presentation via the distributed communications network to an accommodation area and a web site, respectively.

16. The system of claim 15, wherein the presentation elements are at least one of:
a background template;
title text with font and layout specifications;
description text with font and layout specifications;
location text with font and layout specifications;
time and date text with font and layout specifications; and
an audio component.

17. The system of claim 15, further comprising a user-modifiable rule associated with one or more of the presentation elements, wherein the rule is operative for determining one of:

when the presentation element appears in at least one of the television presentation and the web presentation;

how long the presentation element appears in at least one of the television presentation and the web presentation;

if the presentation element appears in:
   the television presentation;
   the web presentation presentation;
   both the television presentation and the web presentation; or printed media;

whether an audio component is to be played in at least one of the television presentation and the web presentations; and a schedule for presenting the presentation element on a repeated basis.

18. The system of claim 15, wherein the software further includes one or more of:

an activity resource manager for detecting any conflicts in scheduling or availability of resources in the accommodation area; and an administrator's interface for editing the community information remotely from the server.

19. The system of claim 15, wherein the software further includes a print generator for:

retrieving the community information from the storage medium;

automatically formatting and laying out the community information into a representation of printed media; and automatically formatting and laying out the presentation elements into the representation of printed media.

20. The system of claim 15, further comprising at least one television channel viewable within the accommodation area for receiving the television presentation.

21. The system of claim 15, wherein the web site is associated with the accommodation area.

22. The system of claim 15, wherein the television presentation is different from the web presentation.

* * * * *

UNITED STATES PATENT AND TRADEMARK OFFICE
CERTIFICATE OF CORRECTION

| | | |
|---|---|---|
| PATENT NO. | : 7,930,722 B2 | Page 1 of 1 |
| APPLICATION NO. | : 11/501404 | |
| DATED | : April 19, 2011 | |
| INVENTOR(S) | : Pepper et al. | |

It is certified that error appears in the above-identified patent and that said Letters Patent is hereby corrected as shown below:

Claim 17, Col. 15, line 7, delete the second occurrence of "presentation"

Signed and Sealed this
Twenty-third Day of August, 2011

David J. Kappos
*Director of the United States Patent and Trademark Office*